US008977617B1

(12) United States Patent
Wu et al.

(10) Patent No.: US 8,977,617 B1
(45) Date of Patent: Mar. 10, 2015

(54) COMPUTING SOCIAL INFLUENCE SCORES FOR USERS

(71) Applicant: Google Inc., Mountain View, CA (US)

(72) Inventors: Ping Wu, Saratoga, CA (US); Kaihua Zhu, Sunnyvale, CA (US)

(73) Assignee: Google Inc., Mountain View, CA (US)

(*) Notice: Subject to any disclaimer, the term of this patent is extended or adjusted under 35 U.S.C. 154(b) by 96 days.

(21) Appl. No.: 13/664,621

(22) Filed: Oct. 31, 2012

(51) Int. Cl.
G06F 7/00 (2006.01)
G06F 17/30 (2006.01)

(52) U.S. Cl.
USPC .......................................... 707/736

(58) Field of Classification Search
USPC .......................................... 707/736
See application file for complete search history.

(56) References Cited

U.S. PATENT DOCUMENTS

| | | | |
|---|---|---|---|
| 6,130,938 | A | 10/2000 | Erb |
| 6,192,119 | B1 | 2/2001 | Wilson |
| 6,697,478 | B1 | 2/2004 | Meldrum et al. |
| 6,754,322 | B1 | 6/2004 | Bushnell |
| 7,106,848 | B1 | 9/2006 | Barlow et al. |
| 7,366,990 | B2 | 4/2008 | Pitroda |
| 7,555,110 | B2 | 6/2009 | Dolan et al. |
| 7,610,287 | B1 | 10/2009 | Dean et al. |
| 7,742,468 | B2 | 6/2010 | Vagelos |
| 2002/0137490 | A1 | 9/2002 | Gallant |
| 2002/0143874 | A1 | 10/2002 | Marquette et al. |
| 2004/0258220 | A1 | 12/2004 | Levine et al. |
| 2005/0152521 | A1 | 7/2005 | Liljestrand |
| 2006/0026288 | A1 | 2/2006 | Acharya et al. |
| 2006/0042483 | A1* | 3/2006 | Work et al. .................. 101/91 |
| 2006/0077957 | A1 | 4/2006 | Reddy et al. |
| 2006/0206604 | A1 | 9/2006 | O'Neil et al. |
| 2007/0127631 | A1 | 6/2007 | Difiglia |
| 2007/0171898 | A1 | 7/2007 | Salva |
| 2007/0173236 | A1 | 7/2007 | Vishwanathan et al. |
| 2007/0248077 | A1 | 10/2007 | Mahle, Jr. et al. |
| 2008/0056475 | A1 | 3/2008 | Brannick et al. |
| 2008/0120166 | A1* | 5/2008 | Fernandez et al. .......... 705/10 |

(Continued)

FOREIGN PATENT DOCUMENTS

WO WO02079984 10/2002

OTHER PUBLICATIONS

Adamic et al., "A Social Network Caught in the Web," Internet Journal, First Monday, Jun. 2, 2003, vol. 8, No. 6, pp. 1-22.

(Continued)

Primary Examiner — Mariela Reyes
Assistant Examiner — Jeffrey Chang
(74) Attorney, Agent, or Firm — Patent Law Works LLP

(57) ABSTRACT

The disclosure includes a system and method for determining an influence score for a user. The system includes a classification module, a controller, a determination module, a ratio module and a score module. The classification module creates an influence profile for a first user. The controller determines activity data associated with a set of active users. The determination module determines how frequently the activity data associated with the active users describes the first user and a second user that has a second influence score. The determination module determines a first user activity score and a second user activity score. The ratio module compares the first user activity score to the second user activity score to determine an influence ratio. The score module determines a first influence score for the first user based at least in part on the influence ratio and the second influence score for the second user.

20 Claims, 9 Drawing Sheets

(56) References Cited

U.S. PATENT DOCUMENTS

2008/0192656 A1    8/2008   Vagelos
2011/0098156 A1    4/2011   Ng et al.

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.
Anwar et al., "Leveraging 'Social-Network' Infrastructure to Improve Peer-to Peer Overlay Performance: Results from Orkut," University of Illinois at Urbana-Champaign USA, 2005, 9 pgs.
AT&T Personal Reach Service: Benefits and Features, Mar. 29, 2010, 7 pgs.
AT&T Personal Reach Service: Personal Reach Service, Mar. 29, 2010, 2 pgs.
Baird et al., "Neomillennial User Experience Design Strategies: Utilizing Social Networking Media to Support "Always On" Learning Styles," J. Educational Technology Systems, vol. 34(1), 2005-2006, Baywood Publishing Co., Inc., pp. 5-32.
Boyd, et al., "Social Network Sites: Definition, History, and Scholarship," Journal of Computer-Mediated Communication, International Communication Association, 2008, pp. 210-230.
Churchill et al., "Social Networks and Social Networking," IEEE Computer Society, Sep.-Oct. 2005, pp. 14-19.
Cohen et al., "Social Networks for Creative Collaboration," C&C '05, Apr. 12-15, 2005, London, United Kingdom, pp. 252-255.
Decker et al., "The Social Semantic Desktop," Digital Enterprise Research Institute, DERI Galway, Ireland, DERI Innsbruck, Austria, DERI Technical Report, May 2, 2004, 7 pgs.
Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.
Eagle et al., "Social Serendipity: Proximity Sensing and Cueing," MIT Media Laboratory Technical Note 580, May 2004, 18 pgs.
Erickson et al., "Social Translucence: Using Minimalist Visualizations of Social Activity to Support Collective Interaction," Designing Information Spaces: The Social Navigation Approach, Springer-verlag: London, 2003, pp. 1-19.
Gross et al., "Information Revelation and Privacy in Online Social Networks," WPES '05, Alexandria, Virginia, Nov. 7, 2005, pp. 71-80.
Hammond et al., "Social Bookmarking Tools (I)," D-Lib Magazine, Apr. 2005, vol. II, No. 4, ISSN 1082-9873, 23 pgs.
Heer et al., "Vizster: Visualizing Online Social Networks," University of California, Berkeley, Oct. 23, 2005, 8 pgs.
International Search Report, International Application No. PCT/US2008/005118, Sep. 30, 2008, 2 pgs.
Leonard, "You Are Who You Know," Internet, retrieved at http://www.salon.com, Jun. 15, 2004, 15 pgs.
LiveJournal, "FAQ #163: How Do I Find a Syndicated Account?" Last Updated: thebubba, Jan. 6, 2004, 2 pgs.
Marwick, "Selling Your Self: Online Identity in the Age of a Commodified Internet," University of Washington, 2005, 192 pgs.
MediaSift Ltd., DataSift: Realtime Social Data Mining Platform, Curate and Data Mine the Real Time Web with DataSift, Dedipower, Managed Hosting, [Retrieved on May 13, 2011], 1 pg.
Metcalf et al., "Spatial Dynamics of Social Network Evolution," 23rd International Conference of the System Dynamics Society, Jul. 19, 2005, pp. 1-13.
Mori et al., "Real-world Oriented Information Sharing Using Social Networks," Group '05, Sanibel Island, Florida, USA, Nov. 6-9, 2005, pp. 81-84.
Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.
Neumann et al., "Semantic social network portal for collaborative online communities," Journal of European Industrial Training, 2005, Emerald Group Publishing, Limited, vol. 29, No. 6, pp. 472-487.
O'Murchu et al., "Online Social and Business Networking Communities," Digital Enterprise Research Institute DERI Technical Report, National University of Ireland, Aug. 11, 2004, 22 pgs.
Ring Central, Inc., Internet, retrieved at http://www.ringcentral.com, Apr. 19, 2007, 1 pg.
Singh et al., "CINEMA: Columbia InterNet Extensible Multimedia Architecture," Department of Computer Science, Columbia University, May 2002, pp. 1-83.
Steen et al., "Development of we-centric, context-aware, adaptive mobile services requires empathy and dialogue," Freeband FRUX, Oct. 17, 2005, Internet Journal, Netherlands, pp. 1-4.
Superfeedr Track, Internet, retrieved at http://blog.superfeedr.com/track/filter/xmpp/pubsubhubbub/track, May 13, 2011, 8 pgs.
Twitter Blog: Tracking Twitter, Internet, retrieved at http://blog.twitter.com/2007/09/tracking-twitter.html, May 13, 2011, 2 pgs.
Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.
Van Eijk et al., "We-centric, context-aware, adaptive mobile service bundles," Freeband, Telematica Instituut, TNO telecom, Nov. 30, 2004, 48 pgs.
Wenger et al., "Technology for Communities," CEFRIO Book Chapter v 5.2, Jan. 18, 2005, pp. 1-15.

* cited by examiner

COMPUTING SOCIAL INFLUENCE SCORES FOR USERS

BACKGROUND

The present disclosure relates to social networks. In particular, the present disclosure relates to determining social influence scores for users.

The popularity of social networks has grown dramatically in recent years. In particular, social networks have become a very popular and a preferred method for interaction between users.

SUMMARY

According to one innovative aspect of the subject matter described in this disclosure, a system for determining an influence score for a user is described. The system includes: a classification module for creating an influence profile for a first user; a controller for determining activity data associated with a set of active users; a determination module for determining how frequently the activity data associated with the active users describes the first user and a second user that has a second influence score, the determination module determining a first user activity score based at least in part on how frequently the activity data associated with the active users describes the first user and a second user activity score based at least in part on how frequently the activity data associated with active users describes the second user; a ratio module for comparing the first user activity score to the second user activity score to determine an influence ratio; and a score module for determining a first influence score for the first user based at least in part on the influence ratio and the second influence score for the second user.

In general, another innovative aspect of the subject matter described in this disclosure may be embodied in methods that include creating an influence profile for a first user; determining activity data associated with a set of active users; determining how frequently the activity data associated with the active users describes the first user and a second user that has a second influence score; determining a first user activity score based at least in part on how frequently the activity data associated with the active users describes the first user; determining a second user activity score based at least in part on how frequently the activity data associated with active users describes the second user; comparing the first user activity score to the second user activity score to determine an influence ratio; and determining a first influence score for the first user based at least in part on the influence ratio and the second influence score for the second user.

Other aspects include corresponding methods, systems, apparatuses, and computer program products for these and other innovative aspects.

These and other implementations may each optionally include one or more of the following operations. For instance, the operations further include: determining a search query included in the activity data and a set of candidate users based at least in part on the search query, matching the set of candidate users with one or more web page content elements associated with the search query to determine a set of matching scores for the set of candidate users, determining one or more top candidate users from the set of candidate users based at least in part on the set of matching scores, the one or more top candidate users having one or more highest matching scores and determining whether the first user is one of the one or more top candidate users; determining a uniform resource locator for a web page included in the activity data, the web page including one or more content elements, mapping the one or more content elements to a cluster, determining a set of candidate users associated with the cluster, matching the set of candidate users with the one or more content elements to determine a set of matching scores for the set of candidate users, determining one or more top candidate users from the set of candidate users based at least in part on the set of matching scores, the one or more top candidate users having one or more highest matching scores and determining whether the first user is one of the one or more top candidate users; parsing the activity data associated with the set of active users that describes the first user, determining a category for the first user based at least in part on the parsing of the activity data, the category describing one or more occupations of the first user and storing the activity data and category data describing the category for the first user in a database; determining the second user based at least in part on the category, the second user having one of the one or more occupations described by the category; determining an influence score bucket range and determining the second user that has the second influence score based at least in part on the influence score bucket range, the second influence score included in the influence score bucket range; the activity data including a search log, a page view history, a video view history, an audio access history and email content record.

The present disclosure may be particularly advantageous in a number of respects. First, the system can provide a one-click option to change the way users are perceived by others online. Second, the system can provide profile preview data for users to review and to choose if they want the changes specified by the profile preview data. Third, the system can evaluate profile impressions to give users sense of how they will be perceived as the type of person they choose to be. Fourth, the system can update user interests based at least in part on user feedback during the process of changing profile impressions, therefore can personalize products and product settings to provide a better product experience for users.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
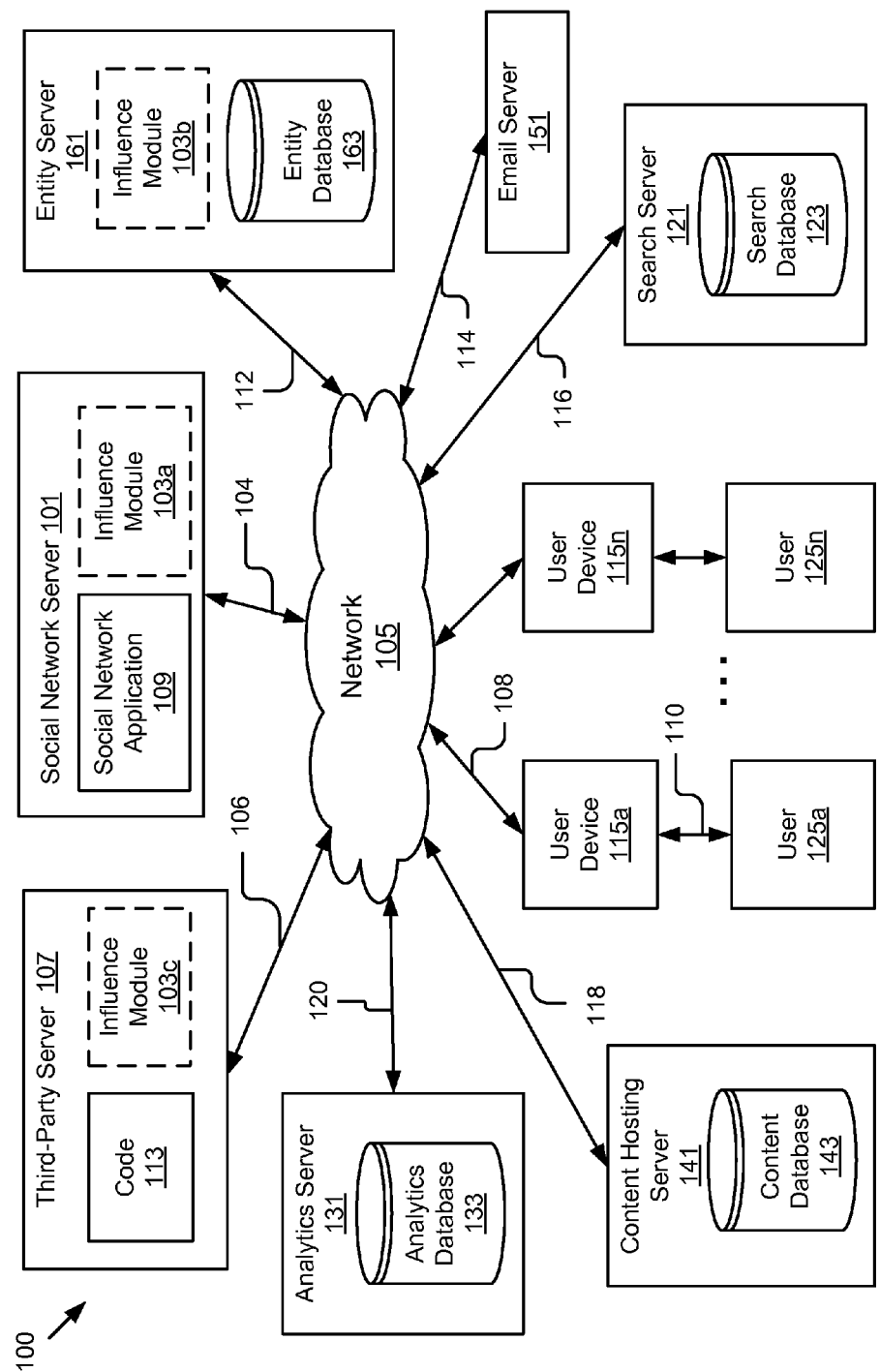
FIG. 1 is a block diagram illustrating an example system for determining influence scores for users.

FIG. 1 illustrates a block diagram of some implementations of a system 100 for determining influence scores for users. The illustrated system 100 for determining influence scores for users includes a social network server 101, a network 105, a third-party server 107, a search server 121, an analytics server 131, a content hosting server 141, an email server 151, an entity server 161 and one or more user devices 115a-115n (also referred to herein individually and collectively as 115) that are accessed by users 125a-125n (also referred to herein individually and collectively as 125). In the illustrated implementation, these entities are communicatively coupled via the network 105. Although only two user devices 115 are illustrated, it should be understood that any numbers of user devices 115 are available to any number of users 125. Moreover, while the present disclosure is described below primarily in the context of determining an influence score for a user, the present disclosure is applicable to improving user experience with other aspects of a social network.

The user devices 115a, 115n in FIG. 1 are used by way of example. While FIG. 1 illustrates two user devices 115, the present disclosure applies to any system architecture having one or more user devices 115. Furthermore, while only one network 105 is coupled to the social network server 101, the third-party server 107, the search server 121, the analytics server 131, the content hosting server 141, the email server 151, the entity server 161 and the user devices 115a, 115n, in practice multiple networks 105 can be connected to these entities. Furthermore, while only one third-party server 107, one search server 121, one analytics server 131, one content hosting server 141, one email server 151 and one entity server 161 are shown, the system 100 could include one or more these entities.

While shown as stand-alone server in FIG. 1, in other implementations all or part of the social network server 101 could be part of the third-party server 107 that is connected to the network 105. The social network server 101 interacts via signal line 104 and the network 105 with the third-party server 107, the user devices 115a-115n and the other entities depicted in FIG. 1. In some implementations, the social network server 101 obtains data from these other servers and components to determine information about a user's category, activity score and influence score. The social network server 101 is coupled for communication with the user device 115a, which is connected to the network 105 via signal line 108. The user 125a interacts with the user device 115a as represented by the signal line 110. Similarly, the user device 115n is coupled to the network 105 via a signal line and the user 125n interacts with the user device 115n as represented by a signal line. It should be understood that the social network server 101 can be stored in any combination of the devices and servers, or in only one of the devices or servers. The third-party server 107 is coupled to the network 105 by signal line 106 for communication with the social network server 101, the user devices 115 and other servers depicted in FIG. 1. The search server 121, the analytics server 131, the content hosting server 141, the email server 151 and the entity server 161 are each coupled to the network 105 by signal line 116, 120, 118, 114, 112, respectively, for communication with the social network server 101, the third-party server 107 and the user devices 115.

In some implementations, the social network server 101, the third-party server 107, the search server 121, the analytics server 131, the content hosting server 141, the email server 151 and the entity server 161 are hardware servers that include a processor, memory, and network communication capabilities.

The social network server 101 as depicted in FIG. 1 includes a social network application 109. Although only one social network server 101 is shown, it should be understood that multiple social network servers 101 may be present. A social network is any type of social structure where the users are connected by a common feature. The common feature includes friendship, family, work, an interest, etc. The common features are provided by one or more social networking systems including explicitly-defined relationships and relationships implied by social connections with other online users, where the relationships form a social graph (not pictured). In some examples, the social graph can reflect a mapping of these users and how they are related. Furthermore, it should be understood that social network server 101 and social network application 109 are representatives of one social network and that there can be multiple social networks coupled to the network 105, each having its own server, application and social graph. For example, a first social network is more directed to business networking, a second is more directed to or centered on academics, a third is more directed to local business, a fourth is directed to dating and others of a general interest or a specific focus.

The social network server 101 also includes an influence module 103a (also referred to herein individually and collectively as 103). In some implementations, the influence module 103 can be included in the entity server 161, which is connected to the network 105 via signal line 112. In some implementations, the influence module 103 can be included in the third-party server 107, which is connected to the network 105 via signal line 106. It should be understood that the influence module 103 can be stored in any combination on the devices and servers. The operation functionality of the influence module 103 is described in more detail below with reference to FIGS. 2-7.

In some implementations, a code 151 can be stored on the third-party server 107. The third-party server 107 includes an application and/or software for generating a third-party website (not shown). In some implementations, the code 151 can be code or routines configured to enable the application and/or software included in the third-party server 107 to communicate with the influence module 103 and/or the social network application 109 so that the application and/or software can use the services provided by the influence module 103 and/or the social network application 109. For example, the code 151 communicates with the social network application 109 to generate an option for acknowledgement indications and incorporate it within the third-party website for users 125 visiting the third-party website to indicate an acknowledgement on at least one item present in the third-party website. In some implementations, the code 151 can be a snippet that includes HyperText Markup Language code ("HTML code") that can be configured to communicate with the influence module 103 and/or the social network application 109 to exchange data, information and/or commands. In some implementations, the code 151 includes code from a group of C, C++, Java, CSS and PHP. Furthermore, while only one code 151 is shown in the third-party server 107, the third-party server 107 could include one or more codes 151.

In some implementations, an entity database 163 can be stored on the entity server 161. The entity database 163 includes information describing users 125. For example, the users 125 can be persons (e.g., celebrities), corporations, organizations, etc. In some implementations, the entity database 163 includes influence profiles for users 125. In some implementations, an influence profile for a user 125 is a profile describing a social influence of the user 125 and other information of the user 125 related to the social influence. For example, the information of a user 125 related to the social influence of the user 125 can be used to determine the social influence of the user 125. For example, an influence profile for a person can include a user name, an age, an occupation, a marital status, a birth date, an experience, an achievement, an interest, family information, etc. An influence profile for a corporation or an organization can describe a title, a product or a service, an establishing date, a history, a founder, etc. In some implementations, an influence profile for a user 125 includes an influence score for the user 125. For example, a user 125 has an account with the social network application 109 and has been assigned an influence score based at least in part on social network data associated with the user 125. The influence profile for the user 125 incorporates the influence score for the user 125. In some implementations, an influence score for a user 125 is determined in other ways which will be described in further detail below with reference to FIGS. 2-7. The influence profile for a user 125 includes the influence score for the user 125 determined in those ways. The social influence and influence score of a user 125 will be described in more detail below with reference to FIG. 2. In some implementations, the entity database 163 also includes category data associated with users 125. The category data is described in more detail below with reference with FIGS. 2-7.

In some implementations, a search database 123 can be stored on the search server 121. In some implementations, the search database 123 includes search logs describing search queries processed by the search server 121. For example, the search logs include both historical search queries and updated search queries input by users 125 to a search website (not pictured) operated by the search server 121.

In some implementations, an analytics database 133 can be stored on the analytics server 131. In some implementations, the analytics database 133 includes data describing a history of web page views processed by the analytics server 131. For example, the analytics database 133 includes data describing a web page viewed by users 125, e.g., content elements included in the web page, viewing numbers for the web page, viewing dates and times, viewer information, etc. The analytics database 133 can also include data describing a cluster and/or a topic for the web page.

In some implementations, a content database 143 can be stored on the content hosting server 141. In some implementations, the content database 143 includes data describing a video and/or audio search history and a video and/or audio visit history. In some implementations, the content database 143 includes the videos and/or audios searched and/or visited by users 125. In some implementations, the content database 143 includes metadata associated with the videos and/or audios searched and/or visited by users 125. In some implementations, an email database (not pictured) can be stored in the email server 151, including email data describing emails sent and received by users 125.

For purposes of clarity and conciseness, the users 125 that perform searching, web page viewing, video and/or audio visiting, video and/or audio searching and email sending and/or receiving are referred to hereinafter as active users 125. The search queries, web page views, video and/or audio visits, video and/or audio searches and email data that are stored in these databases 123, 133, 143 and the email database (not pictured) are referred to hereinafter as activity data. In some implementations, the activity data can also include other online activities performed by the active users 125. The activity data will be described in more detail below with FIGS. 2-7.

The network 105 can be wired or wireless, and may have any number of configurations including a star configuration, token ring configuration or other configurations. Furthermore, the network 105 may include a local area network (LAN), a wide area network (WAN) (e.g., the Internet), and/or any other interconnected data path across which multiple devices may communicate. In yet another implementation, the network 105 may be a peer-to-peer network. The network 105 may also be coupled to or includes portions of a telecommunications network for sending data in a variety of different communication protocols. In yet another implementation, the network 105 includes Bluetooth communication networks or a cellular communications network for sending and receiving data including via short messaging service (SMS), multimedia messaging service (MMS), hypertext transfer protocol (HTTP), direct data connection, WAP, email, etc.

Figure 2:
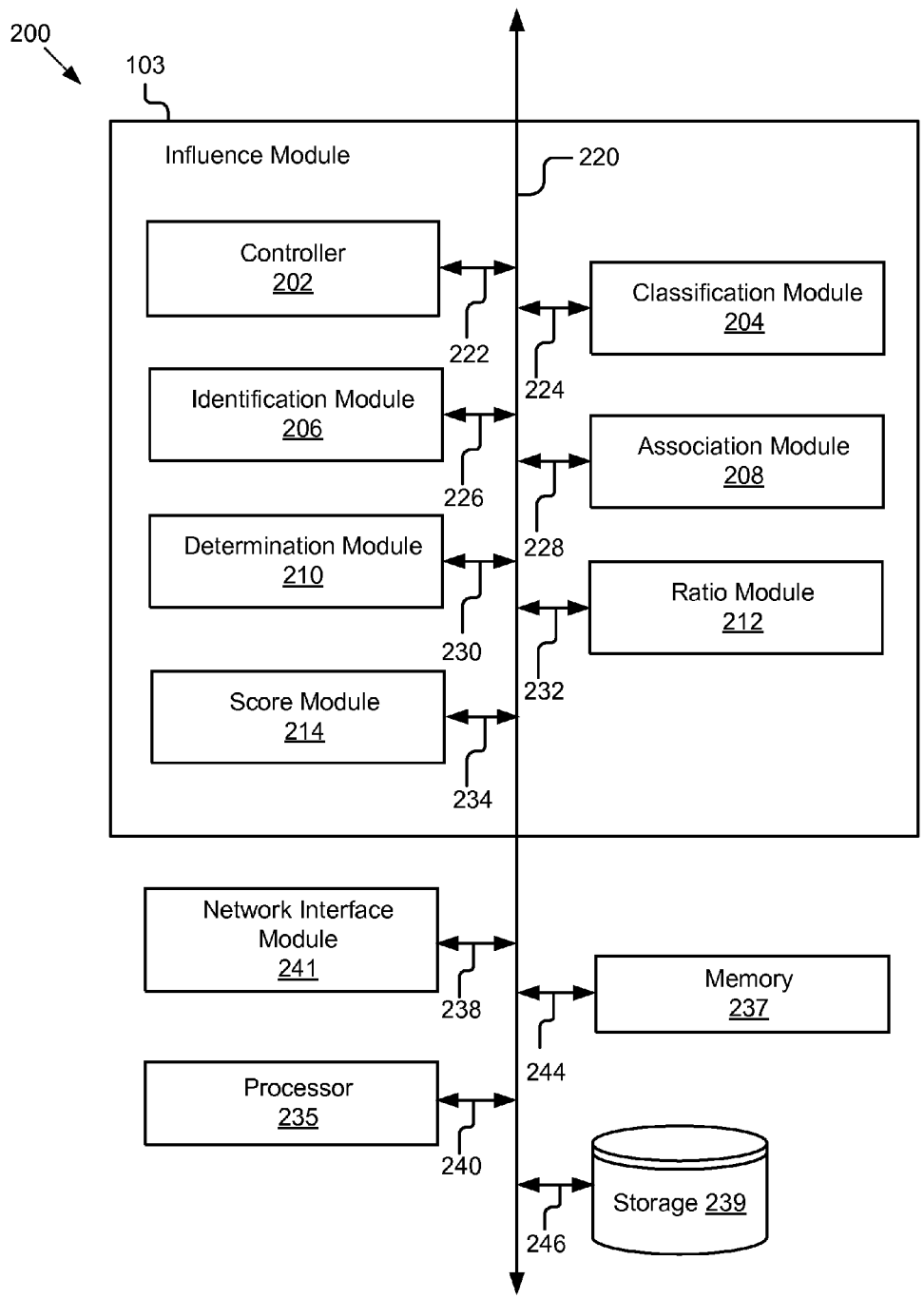
FIG. 2 is a block diagram illustrating an example of an influence module.

Referring now to FIG. 2, the influence module 103 is shown in more detail. FIG. 2 is a block diagram of some implementations of a computing device 200 that includes the influence module 103, a memory 237, a processor 235, a storage 239 and a network interface module 241. Optionally, the computing device 200 can be the social network server 101. In some implementations, the computing device 200 can be the entity server 161. In some implementations, the computing device 200 can be the third-party server 107.

The network interface module 241 can be coupled to network 105 by a signal line (not shown) and also coupled to the bus 220 via signal line 238. The network interface module 241 includes ports for wired connectivity including USB, SD, or CAT-5, etc. The network interface module 241 links the processor 235 to the network 105 that may in turn be coupled to other processing systems. The network interface module 241 provides other connections to the network 105 using network protocols including TCP/IP, HTTP, HTTPS or SMTP. In other implementations, the network interface module 241 includes a transceiver for sending and receiving signals using Wi-Fi, Bluetooth® or cellular communications for wireless communication.

The processor 235 includes an arithmetic logic unit, a microprocessor, a general-purpose controller or some other processor array to perform computations and provide electronic display signals to a display device. The processor 235 can be coupled to the bus 220 via signal line 240 for communication with the other components. Processor 235 processes data signals and may include various computing architectures including a complex instruction set computer (CISC) architecture, a reduced instruction set computer (RISC) architecture, or an architecture implementing a combination of instruction sets. Although only a single processor is shown in FIG. 2, multiple processors may be included. Other processors, operating systems, sensors, displays and physical configurations are possible.

The memory 237 stores instructions and/or data that may be executed by processor 235. The memory 237 can be coupled to the bus 220 via signal line 244 for communication with the other components. The instructions and/or data may include code for performing any and/or all of the techniques described herein. The memory 237 may be a dynamic random access memory (DRAM) device, a static random access memory (SRAM) device, flash memory or some other memory device.

In some implementations, the storage 239 stores data, information and instructions used by the influence module 103. Such stored information includes information about users, messages, posts, photos, and other information. The storage 239 may be a non-volatile memory or similar permanent storage device and media, for example, a hard disk drive, a floppy disk drive, a CD ROM device, a DVD ROM device, a DVD RAM device, a DVD RW device, a flash memory device, or some other mass storage device for storing information on a more permanent basis. The storage 239 can be coupled to the bus 220 via signal line 246 for communication with other components 202, 204, 206, 208, 210, 212, 214, 235, 237 and 241 of the computing device 200.

In some implementations, the data stored in the storage 239 includes activity score data, influence ratio data and influence score data. In some implementations, the storage 239 stores other data necessary for the influence module 103 to complete its functionality.

The activity score data describes activity scores determined by the influence module 103 for users 125 based at least in part on activity data describing the users 125. As described above, the activity data includes online activities performed by the active users 125. For example, the activity data can include search queries input by a set of active users 125 to a search website, web pages viewed by a set of active users 125, video and/or audio searched and/or visited by a set of active users 125 and emails sent and/or received by a set of active users 125. In some implementations, an activity score for a first user 125 indicates how much other active users 125 are interested in the first user 125. For example, the activity data describing a first user 125 represents implicit acknowledgement indications to the first user 125. The activity score measures how many these implicit acknowledgement indications to the first user 125.

In some implementations, the influence module 103 determines how frequently the activity data describes a user 125 and determines an activity score for the user 125 accordingly. For example, the influence module 103 retrieves search queries associated with a set of active users 125 from the search database 123. The influence module 103 determines how frequently the search queries associated with the set of active users 125 describe a first user 125. For example, assume the first user 125 is called "XX YYY." The influence module 103 determines that some of the search queries include the name of the first user 125. For example, some of the search queries include the text of "XX YYY." Examples of these search queries can include "birthday of XX YYY," "the new book of XX YYY," "is XX YYY dead," etc. In some implementations, the influence module 103 can apply more complicated methods to determine whether a piece of activity data describes a first user 125. These will be described in more detail below with reference to the determination module 210 included in the influence module 103. In some implementations, the influence module 103 determines the number and/or a proportion of the search queries describing the first user 125. For example, the influence module 103 determines that 30 out of 100 search queries describe the first user 125. The influence module 103 can then determine an activity score for the first user 125 based at least in part on the proportion of the search queries describing the first user 125. For example, the activity score is determined for the first user 125 as 3 out of 10.

There can be other examples for determining an activity score for a user 125. A more general example is that the influence module 103 retrieves activity data associated with a set of active users 125 (not only search queries, but also other types of activity data described above), determines the frequency at which the activity data describes a first user 125 and determines an activity score for the first user 125 based at least in part on the frequency. In some implementations, the influence module 103 stores the activity score for the first user 125 in the storage 239.

The influence ratio data is data describing influence ratios used to determine influence scores for users 125. In some implementations, an influence ratio can be a ratio between activity scores for a first user 125 and a second user 125. For example, assume that the activity score for a first user 125 is 3 out of 10 and the activity score for a second user 125 is 6 out of 10. Then the influence ratio between the first user 125 and the second user 125 is 0.5. The influence ratio can be used to further determine a first influence score for the first user 125 assuming that the second user 125 has been assigned a second influence score. The assumption here is that an influence ratio between activity scores for users 125 represents a ratio between influences of the users 125. In some implementations, the influence module 103 stores the influence ratios between users 125 in the storage 239.

In some implementations, the influence module 103 calculates an influence ratio between an activity score and an influence score for one user 125 instead of a ratio between two activity scores for two users 125. For example, assume that a user 125 has an activity score of 2.5 out of 10 and has been assigned an influence score of 5 out of 10. Then an influence ratio can be the ratio between the user's 125 activity score and influence score, which is 0.5. This influence ratio will also be referred to hereinafter as an "exchange ratio," because it represents the ratio used to "exchange" an activity score for an influence score. For example, the influence module 103 determines an exchange ratio based at least in part on the activity score and influence score for a second user 125, which is, e.g., 0.5. Now assume that a first influence score for a first user 125 needs to be determined. For example, the first user 125 and the second user 125 are both well-known investors during the same time. But they might not have equal social influence. Due to the similarity between the first user 125 and the second user 125, the influence module 103 can assume the first user 125 has the same exchange ratio as the second user 125. In other words, if the first user 125 has a higher activity score than the second user 125, the first user 125 is assumed to have a higher influence score than the second user 125. On the other hand, if the first user 125 has a lower activity score than the second user 125, the first user 125 is assumed to have a lower influence score than the second user 125. Therefore, the influence module 103 can apply the exchange ratio (e.g., 0.5) to the activity score (e.g., 3 out of 10) for the first user 125 to estimate an influence score for the first user 125. As a result of math, the influence score for the first user 125 is determined to be 6 out of 10.

In some implementations, as a rough method, the influence module 103 picks a random second user 125 to determine an exchange ratio and then to determine an influence score for a first user 125. In some implementations, as a more sophisticated method, the influence module 103 selects a set of second users 125 associated with a first user 125 (e.g., a set of 10 well-known investors during the same time as the first investor 125), determines an average exchange ratio based at least in part on activity scores and second influence scores for the set of second users 125 and estimates a first influence score for the first user 125 based at least in part on the average exchange ratio.

The influence score data is data describing influence scores for users 125. An influence score for a user 125 measures a degree of how much the user 125, e.g., a person, a corporation, an organization, etc., influences other users 125. For example, a sports star wins several games, speeches publicly during an interview, attends a celebrity party, etc., which cause attentions and/or reactions from other people. Then the sport start has a certain social influence on other people. Accordingly, an influence score quantifies the social influence of a user 125 on other users 125. In some implementations, a higher influence score represents a larger influence. For example, if a first user 125 obtains more attentions from other second users 125, or if the first user's 125 activities including not only online activities (e.g., submitting posts and/or photos, receiving replies and/or comments, etc.) but also activities in reality (e.g., publishing books, acting in movies, visiting places, etc.) cause more other second users' 125 reactions, or if entities associated with the first user 125

(e.g., products of the first user 125, third users 125 associated with the first user 125, etc.) cause more attentions, etc., then the first user 125 has a larger influence on the other second users 125 and thus should be assigned a higher influence score. This present disclosure provides a method to estimate an influence score for a user 125 even if the user 125 does not have an account with the social network application 109 or have any online activity with social networks. As described in more detail below, the influence module 103 determines a first influence score for a first user 125 based at least in part on activity data describing the first user 125 and one or more second users 125 that have one or more second influence scores. Furthermore, in some implementations, the first influence score determined for the first user 125 can then be used as a second influence score along with other second influence scores to determine a third influence score for a third user 125.

Referring to FIG. 2, the influence module 103 is shown in greater detail. The influence module 103 includes a controller 202, a classification module 204, an identification module 206, an association module 208, a determination module 210, a ratio module 212 and a score module 214. One function of the makeover module 103 can be to determine influence scores for users 125. These components 202, 204, 206, 208, 210, 212 and 214 are coupled to the bus 220 for communication with each other and the other components 241, 235, 237 and 239 of the computing device 200. The bus 220 can be any type of communication bus. The operation of these modules 202, 204, 206, 208, 210, 212 and 214 will be described in more detail below with reference to FIGS. 3-7.

The controller 202 can be software including routines for retrieving data via the network interface module 241, routing data to appropriate modules and transmitting results from modules to databases and/or storage for storing the results. In some implementations, the controller 202 can be a set of instructions executed by the processor 235 to provide functionality described below for handling communications between the influence module 103 and other components of the computing device 200. In some implementations, the controller 202 can be stored in the memory 237 of the computing device 200 and can be accessible and executable by the processor 235. The controller 202 may be adapted for cooperation and communication with the processor 235 and other components of the computing device 200 via signal line 222.

In some implementations, the controller 202 sends and receives data, via the network interface module 241, to and from the social network server 101, the third party server 107, the entity server 161, the search server 121, the analytics server 131, the content hosting server 141 and the email server 151. For example, the controller 202 retrieves, via the network interface module 241, activity data from the search server 121, the analytics server 131, the content hosting server 141 and the email server 151 and sends activity data to the classification module 204. The activity data describes online activities associated with a set of active users 125. For example, the activity data includes search queries, web page views, video and/or audio searches, video and/or audio visits, email correspondences performed by a set of active users 125. More importantly, the activity data describes one or more target users 125. For example, the activity data can include a search query regarding a first target user 125 (e.g., a well-known investor). For example, the activity data can include a video viewed by active users 125 and the video can be a television interview of a second target user 125 (e.g., a movie star). In some implementations, the controller 202 sends the activity data to the classification module 204 for classifying the one or more target users 125 based at least in part on the activity data describing the one or more target users 125. For example, the classification module 204 determines one or more categories for a target user 125 based at least in part on activity data describing the target user 125 and sends category data describing the one or more categories for the target user 125 back to the controller 202. The controller 202 transmits, via the network interface module 241, the category data to the entity server 161 for storing the category data in the entity database 163. The operation functionality of the classification module 204 will be described in more detail below.

In some implementations, the controller 202 corporates with the identification module 206 identifying a first user 125 to retrieve, via the network interface module 241, the category data for the first user 125 from the entity database 163 and sends the category data to the association module 208 for determining one or more second users 125 associated with the first user 125 based at least in part on the category data. In some implementations, the controller 202 retrieves, via the network interface module 241, activity data from the search server 121, the analytics server 131, the content hosting server 141 and the email server 151 and sends the activity data to the determination module 210 for determining how frequently the activity data describes a first user 125 and one or more second users 125.

In some implementations, the controller 202 receives data from other components of the influence module 103 and stores the data in the storage 239. For example, the controller 202 receives activity score data from the determination module 210 and stores the activity score data in the storage 239. In some implementations, the controller 202 retrieves data from the storage 239 and sends the data to other components of the influence module 103. For example, the controller 202 retrieves influence ratio data from the storage 239 and sends the influence ratio data to the score module 214 for calculating an influence score.

In some implementations, the controller 202 handles communications between components of the influence module 103. For example, the controller 202 receives data from one component of the influence module 103 and sends the data to another component of the influence module 103. For example, the controller 202 receives activity score data from the determination module 210 and sends the activity score data to the ratio module 212 to calculate an influence ratio based at least in part on the activity score data. For purposes of clarity and conciseness, the controller 202 may be omitted hereinafter when describing such a process. For example, the above process may be described as the following: the determination module 210 sends activity score data to the ratio module 212 to calculate an influence ratio based at least in part on the activity score data.

The classification module 204 can be software including routines for classifying one or more users 125 based at least in part on activity data. In some implementations, the classification module 204 can be a set of instructions executable by the processor 235 to provide the functionality described below for classifying one or more users 125 based at least in part on activity data. In some implementations, the classification module 204 can be stored in the memory 237 of the computing device 200 and can be accessible and executable by the processor 235. The classification module 204 may be adapted for cooperation and communication with the processor 235 and other components of the computing device 200 via signal line 224.

In some implementations, the classification module 204 creates one or more influence profiles for one or more users 125 stored in the entity database 163. As described above with reference to FIG. 1, an influence profile for a user 125 includes information associated with the user 125. For example, the classification module 204 creates an influence profile for a user 125 (e.g., a corporation) describing an establishing date, one or more founders, major products and/or services, etc. The classification module 204 stores, via the controller 202, the influence profile in the entity database 163. In this way, the classification module 204 builds and updates the entity database 163 for storing information for one or more users 125.

In some implementations, the classification module 204 determines one or more categories for a user 125 stored in the entity database 163. For example, the classification module 204 receives activity data from the controller 202, parses the activity data and determine one or more categories for a user 125 described by the activity data. As described above, the activity data include data describing online activities, e.g., search queries, web page views, video and/or audio searches, video and/or audio visits, email correspondences. In some implementations, the classification module 204 determines a group of activity data that describes a first user 125 and determines one or more categories for the first user 125 based at least in part on the group of activity data describing the first user 125. For example, the classification module 204 determines a group of web articles and videos viewed by a set of active users 125 that describes a first user 125. By parsing the group of web articles and videos, the classification module 204 determines that the first user 125 is a stock trader. The classification module 204 then categorizes the first user 125 into the class of stock trader. Therefore, a category for a user 125 can be an occupation of the user 125. In some implementations, a category for a user 125 can be one of other features of the user 125. For example, a category for a user 125 can be an experience of the user 125, a hobby of the user 125, the type of a product or service of the user 125 if the user 125 is a corporation, etc. In some implementations, the classification module 204 applies a supervised learning approach for categorizing users 125. For example, a first user 125 is labeled by an administrator (e.g., an administrator for the server 101, 161 or 107) with one or more categories (e.g., actor, director, philanthropist, etc.) based at least in part on some common sense. The classification module 204 determines whether the first user 125 can be classified into the one or more labeled categories by parsing a group of activity data that describes the first user 125.

In some implementations, the classification module 204 corporates with the determination module 210 determining a group of activity data describing a user 125 and determines one or more categories for the user 125 based at least in part on the group of activity data. In some implementations, the classification module 204 stores, via the controller 202, the category data describing the one or more categories for the first user 125 and the activity data describing the first user 125 in the entity database 163. The entity database 163 stores category data for users 125 and activity data describing users 125. The category data can then be used to determine a set of second users 125 related to a first user 125 and the set of second users 125 have second influence scores. The activity data describing users 125 can be used to determine activity scores for the first and second users 125. The second influence scores and the activity scores can then be used to calculate an influence score for the first user 125.

The identification module 206 can be software including routines for identifying a user 125 from the entity database 163. In some implementations, the identification module 206 can be a set of instructions executable by the processor 235 to provide the functionality described below for identifying a user from the entity database 163. In some implementations, the identification module 206 can be stored in the memory 237 of the computing device 200 and can be accessible and executable by the processor 235. The identification module 206 may be adapted for cooperation and communication with the processor 235 and other components of the computing device 200 via signal line 226.

In some implementations, the identification module 206 identifies a first user 125 indicated by the entity database 163. In some implementations, the identification module 206 corporates with the controller 202 to retrieves, via the network interface module 241, category data and/or influence profile for the first user 125 from the entity database 163. The identification module 206 sends the category data and/or influence profile for the first user 125 to the association module 208 for determining a set of second users 125 associated with the first user 125 based at least in part on the category data and/or influence profile.

The association module 208 can be software including routines for determining a set of second users 125 for calculating a first influence score for a first user 125. In some implementations, the association module 208 can be a set of instructions executable by the processor 235 to provide the functionality described below for determining a set of second users 125 associated with a first user 125. In some implementations, the association module 208 can be stored in the memory 237 of the computing device 200 and can be accessible and executable by the processor 235. The association module 208 may be adapted for cooperation and communication with the processor 235 and other components of the computing device 200 via signal line 228.

In some implementations, the association module 208 determines whether users 125 have existing influence scores. For example, the association module 208 determines whether a user 125 has an account with the social network application 109. Having an account with the social network application 109, a user 125 has been assigned an influence score based at least in part on social network data associated with the user 125. Assume a first user 125 has an active social network account with the social network application 109. An influence score for the first user 125 can be calculated by the social network application 109 based at least in part on social network data associated with the first user 125, e.g., posts, comments, acknowledgement indications, videos and pictures submitted by the first user 125 and submitted by other second users 125 for responding to the first user 125.

In some implementations, the influence score for the first user 125 is stored with the influence profile for the first user 125 in the entity database 163. Accordingly, in some implementations, the association module 208 determines whether a user 125 has an existing influence score based at least in part on the influence profile for the user 125. In some implementations, the association module 208 merges the entity database 163 with the accounts from the social network application 109. This merging process is non-trivial since it joins two semi-structured data sources. In this way, the association module 208 can easily determines which users 125 indicated by the entity database 163 have existing influence scores and which users 125 do not have based at least in part on whether the users 125 have accounts with the social network application 109. In some implementations, the association module 208 applies one or more techniques and/or a combination of the one or more techniques to implement the merging process. For example, the one or more techniques include text matching algorithm, edit distance algorithm and n-gram similarity matching algorithm.

In some implementations, for the users 125 stored in the merged entity database 163, the association module 208 determines that some of the users 125 have corresponding accounts with the social network application 109 and that some of the users 125 do not have accounts with the social network application 109. Assume the users 125 stored in the entity database 163 are a group of celebrities. The association module 208 determines that some of the celebrities have active accounts with the social network application 109 (e.g., some tech bloggers, etc.) and some of them do not have. In some implementations, the association module 208 determines a set of second users 125 from the group of celebrities having active accounts with the social network application 109 and thus having second influence scores. The association module 208 sends information describing the set of second users 125 including their second influence scores to the other appropriate modules 212, 214 for determining a first influence score for a first user 125 (e.g., another celebrity).

In some implementations, the association module 208 determines one or more second users 125 having existing second influence scores by querying the storage 239. For example, the score module 214 calculates influence scores for users 125 and stores the influence scores in the storage 239. The association module 208 searches the storage 239 to determine a second user 125 having a second influence score and the second influence score for the second user 125 can then be used to calculate a first influence score for a first user 125.

In some implementations, the association module 208 determines a set of second users 125 having existing second influence scores randomly for calculating a first influence score for a first user 125. In other words, the set of second users 125 may not be related to the first user 125. The set of second user 125 is chosen randomly by the association module 208 as long as they have existing second influence scores. Alternatively, a more beneficial way is to determine a set of second users 125 related to the first user 125. Accordingly, in some implementations, the association module 208 determines a set of second users 125 related to the first user 125 and having existing second influence scores based at least in part on category data describing categories for the first user 125 and the second users 125. As described above, the entity database 163 is built offline and stores category data for users 125. In some implementations, the association module 208 retrieves, via the controller 202, category data describing one or more categories for the first user 125 from the entity database 163. The association module 208 determines a set of second users 125 that have at least one same category as the first user 125. For example, the category data indicates that the first user 125 is an investor. The association module 208 determines a set of second users 125 who are also investors and have existing second influence scores. For example, the category data indicates that the first user 125 is a high tech company producing digital products. The association module 208 determines a set of second users 125 that are also high tech companies producing similar digital products.

In some implementations, if a first user 125 is classified into more than one category, the association module 208 determines more than one sets of second users 125. For example, the association module 208 determines a set of second users 125 for each category of the first user 125. Assume a first user 125 is an actor and a director. The association module 208 determines a set of other actors (e.g., 10 actors) and a set of other directors (e.g., 10 directors) who have existing influence scores.

In some implementations, the association module 208 determines a set of second users 125 associated with a first user 125 also based at least in part on whether the second influence scores for the set of second users 125 are within an influence score bucket range. For example, assume that an influence score scales from 0 to 10. An influence score bucket range can be from 0 to 5 and from 6-10. The association module 208 determines a bucket range as from 6-10. The association module 208 determines a set of second users 125 that have second influence scores within the bucket range of from 6-10. For example, if influence scores for a set of users 125 are 6, 7, 7, 8, 8, 8, 9, 9, then the association module 208 determines the set of users 125 as the second users 125.

In some implementations, the association module 208 determines a set of second users 125 for a category and influence score bucket range pair. For example, for one category and in one bucket range, the association module 208 determines a set of second users 125. Information for the set of second users 125 including their second influence scores can then be used to calculate an influence ratio for the category and bucket range pair. For example, the association module 208 determines a set of second users 125 that belong to the category of investor and have second influence scores within the range of from 3-6 out of 10. The association module 208 sends the second influence scores for the set of second users 125 to the ratio module 212 for calculating exchange ratios for the pair of investor and score range of from 3-6 based at least in part on the second influence scores.

The determination module 210 can be software including routines for determining activity scores for users 125 based at least in part on activity data. In some implementations, the determination module 210 can be a set of instructions executed by the processor 235 to provide functionality described below for determining activity scores for users 125. In some implementations, the determination module 210 can be stored in the memory 237 of the computing device 200 and can be accessible and executable by the processor 235. The determination module 210 may be adapted for cooperation and communication with the processor 235 and other components of the computing device 200 via signal line 230.

In some implementations, the determination module 210 determines whether activity data describes a user 125. For example, the determination module 210 receives activity data from the controller 202, processes the activity data and determines whether the activity data describes a user 125. In some implementations, the determination module 210 identifies a search log included in the activity data. For example, the search log includes a search query and a click through Uniform Resource Locator ("URL"). The determination module 210 identifies the search query and the URL in the search log. The determination module 210 determines a list of candidate users 125 from the entity database 163. For example, the determination module 210 determines the list of candidate users 125 based at least in part on the search query. For example, the determination module 210 determines a list of top users 125 indicated by the entity database 163 (e.g., users 125 ranked by an administrator of the entity database 163 as the highest). The determination module 210 matches the list of candidate users 163 with one or more web page content elements indicated by the URL to determine matching scores for the list of candidate users 163. For example, the determination module 210 determines a web page indicated by the click through URL. The determination module 210 parses the web page and determines one or more web page content elements. For example, the determination module 210 determines that the web page includes a photo of a first user 125 (e.g., a celebrity) and texts describing the first user 125. The determination module 210 compares information for the list of candidate users 125 (e.g., information from the influence profiles for the candidate users 125) with the content elements, e.g., the photo and texts describing the first user 125, and determines matching scores for the candidate users 125 based at least in part on whether the information for the candidate users 125 matches to the content elements and/or how many content elements the information for the candidate users 125 matches to. For example, a candidate user 125 who matches more content elements is assigned a higher matching score. The determination module 210 ranks the list of candidate users 125 based at least in part on their matching scores and determines one or more top candidate users that have one or more highest matching scores.

In some implementations, the determination module 210 identifies a page view record included in activity data. For example, the page view record includes a web page URL and a web page Hypertext Transfer Protocol ("HTTP") referrer header. The determination module 210 identifies the web page URL and a web page linked by the URL. The determination module 210 parses the web page content and determines one or more content elements included in the web page. For example, the web page includes an article and the determination module 210 determines texts included in the article. In some implementations, the determination module 210 maps the web page content elements to a cluster (e.g., a rephil cluster). The determination module 210 determines a set of candidate users 125 associated with the cluster. Cluster information describing one or more clusters that a user 125 is associated with can be predetermined in an offline process. For example, the classification module 204 determines clusters for users 125 indicated by the entity database 163 offline and stores the cluster information describing the clusters for users 125 into the entity database 163. In some implementations, the determination module 210 matches the set of candidate users 125 with content elements included in the web page and determines matching scores for the set of candidate users 125. For example, the determination module 210 applies textual similar metrics and computes matching scores for the set of candidate users 125. The determination module 210 ranks the set of candidate users 125 and determines one or more top candidate users 125 that have one or more highest matching scores.

In some implementations, the determination module 210 determines whether a first user 125 is among the one or more top candidate users 125. If the determination module 210 determines that the first user 125 is among the one or more top candidate users 125, then the determination module 210 determines that the piece of activity data, e.g., the search query log, the page view record, describes the first user 125. If the determination module 210 determines that the first user 125 is not among the one or more top candidate users 125, then the determination module 210 determines that the piece of activity data does not describe the first user 125. In some implementations, the determination module 210 stores, via the controller 202, the activity data describing the first user 125 in the entity database 163.

In some implementations, the determination module 210 determines how frequently activity data describes a user 125 and determines an activity score for the user 125 based at least in part on how frequently the activity data describes the user 125. For example, the determination module 210 retrieves, via the controller 202, activity data describing a first user 125 from the entity database 163 and calculate a volume of the activity data. For example, the determination module 210 determines that 5,460 searches query the first user 125 in search engines; web pages describing the first user 125 have been viewed for 10,280 times; videos shooting the first user 125 have been watched for 3,986 times. The determination module 210 determines a first volume of 19,726 for the activity data describing the first user 125. In some implementations, the determination module 210 converts the first volume of the activity data describing the first user 125 to a frequency by comparing the first volume to a whole volume of activity data. For example, the whole volume of activity data can be an estimated value, e.g., 100,000. Accordingly, the frequency at which the activity data describes the first user 125 is determined as 19.726%. The determination module 210 determines an activity score for the first user 125 based at least in part on the frequency at which the activity data describes the first user 125. For example, the determination module 210 determines an activity score of 1.9726 out of 10 for the first user 125.

In some implementations, the determination module 210 determines a first user activity score for a first user 125 identified by the identification module 206 and second user activity scores for a set of second users 125 associated with the first user 125 determined by the association module 208. In some implementations, the determination module 210 sends determined activity scores for users 125 to the ratio module 212 for calculating one or more influence ratios. In some implementations, the determination module 210 stores the determined activity scores for users 125 in the storage 239.

The ratio module 212 can be software including routines for determining influence ratios. In some implementations, the ratio module 212 can be a set of instructions executed by the processor 235 to provide functionality described below for determining influence ratios. In some implementations, the ratio module 212 can be stored in the memory 237 of the computing device 200 and can be accessible and executable by the processor 235. The ratio module 212 may be adapted for cooperation and communication with the processor 235 and other components of the computing device 200 via signal line 232.

In some implementations, the ratio module 212 receives activity scores for a first user 125 and a second user 125 from the determination module 210 and compares their activity scores to determine an influence ratio. The influence ratio can then be used by the score module 214 to calculate a first influence score for the first user 125. In some implementations, the ratio module 212 receives a first activity score for a first user 125 and a set of second activity scores for a set of second users 125 from the determination module 210. For example, the set of second activity scores are determined by the determination module 210 for a set of second users 125 from the same category as the first user 125. The ratio module 212 calculates a set of influence ratios by comparing the first activity score with the second activity scores respectively. In some implementations, the ratio module 212 averages the set of influence ratio to obtain an average influence ratio.

In some implementations, the ratio module 212 receives a set of second activity scores for a set of second users 125 from the determination module 210 and a set of second influence scores for the set of second users 125 from the association module 208. For example, the set of second users can be within one category and their second influence scores can be within one score bucket range. The ratio module 212 determines exchange ratios for the pair of the category and the score bucket range that the set of second users 125 belong to by comparing the second activity scores with the second influence scores for the set of second users 125. In some implementations, the ratio module 212 can further average the exchange ratios to determine an average exchange ratio.

In some implementations, the ratio module 212 sends the determined influence ratio and/or exchange ratio to the score module 214 for calculating an first influence score for the first user 125. In some implementations, the ratio module 212 stores the determined influence ratio and/or exchange ratio in the storage 239.

The score module 214 can be software including routines for determining influence scores for users 125. In some implementations, the score module 214 can be a set of instructions executed by the processor 235 to provide functionality described below for determining influence scores for users 125. In some implementations, the score module 214 can be stored in the memory 237 of the computing device 200 and can be accessible and executable by the processor 235. The score module 214 may be adapted for cooperation and communication with the processor 235 and other components of the computing device 200 via signal line 234.

In some implementations, the score module 214 receives an influence ratio and one or more second influence scores for one or more second users 125. The score module 214 determines a first influence score for the first user 125 based at least in part on the influence ratio and the one or more second influence scores for one or more second users 125. For example, the score module 214 receives an influence ratio (e.g., 0.5) that is the ratio between a first activity score for a first user 125 and a second activity score for a second user 125. The score module 214 also receives a second influence score for the second user 125 that is, e.g., 6 out of 10. The score module 214 can determine a first influence score for the first user by multiplying the second influence score by the influence ratio. Therefore, the first influence score can be determined as 3 out of 10.

In some implementations, the score module 214 receives a first activity score for the first user 125 and an exchange ratio and determines a first influence score for the first user 125 based at least in part on the first activity score for the first user 125 and the exchange ratio. For example, a first activity score for the first user 125 can be 2 out of 10. An average exchange ratio determined based at least in part on second activity scores and second influence scores for a set of second users 125 can be 0.4. Therefore, the score module 214 can determine a first influence score for the first user 125 by applying the average exchange ratio to the first activity score. The first influence score for the first user 125 can then be 8 out of 10.

In some implementations, the score module 214 stores the first influence score for the first user 125 in the storage 239. In some implementations, the score module 214 stores, via the controller 202, the first influence score for the first user 125 into the entity database 163. In either way, the first influence score for the first user 125 can then be retrieved and used to determine other users' 125 influence scores consequently.

One or more of the controller 202, the classification module 204, the identification module 206, the association module 208, the determination module 210, the ratio module 212 and the score module 214 are executable on the processor 235; store data that, when executed by the processor 235, causes the collectors/modules to perform the operations described herein; are instructions executable by the processor 235 to provide the functionality described herein; or are stored in the memory 237 of the computing device 200 and are accessible and executable by the processor 235.

Figure 3:
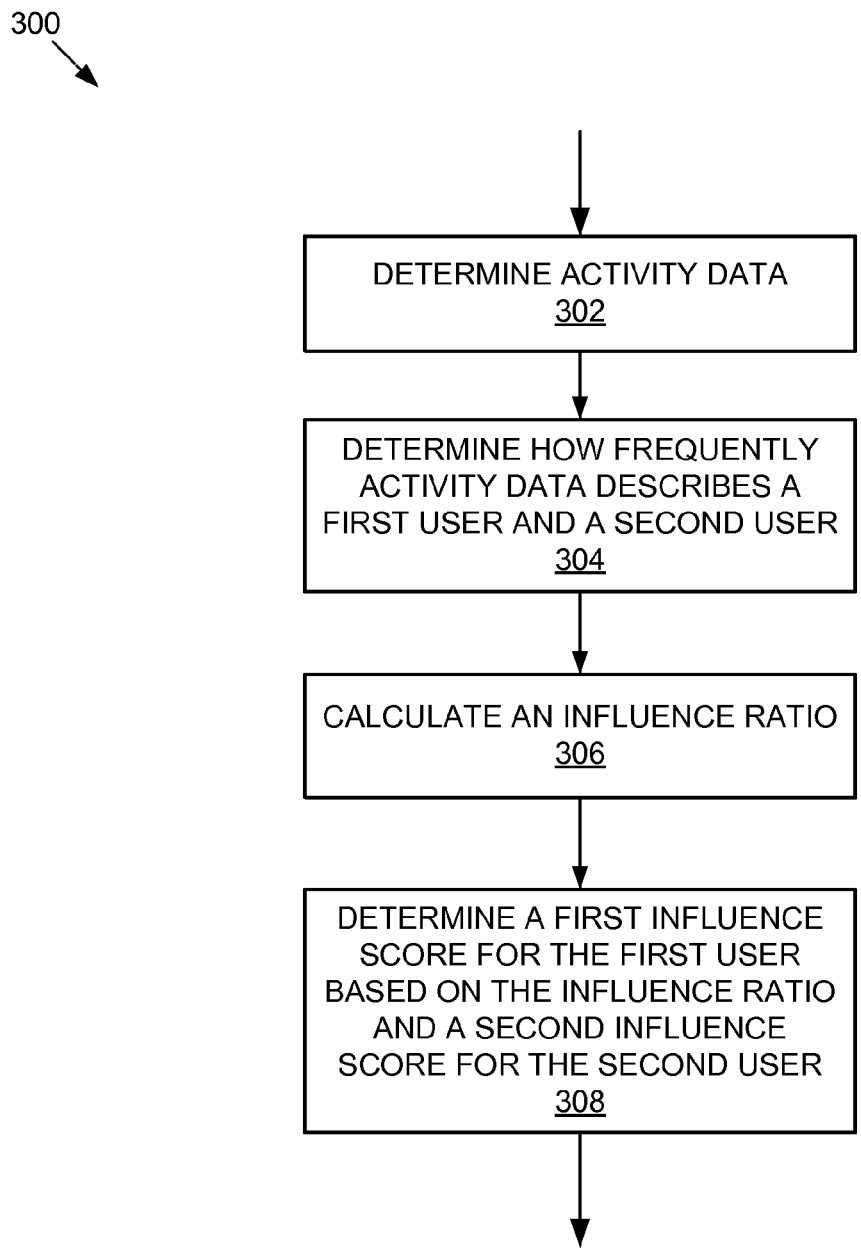
FIG. 3 is a flowchart of an example method for determining an influence score for a user.

Referring now to FIG. 3, an example of a method 300 for determining an influence score for a user 125 is described. The method 300 can include determining 302 activity data. For example, as described above, the controller 202 retrieves, via the network interface module 241, activity data from the search server 121, the analytics server 131, the content hosting server 141 and the email server 151 and sends activity data to the determination module 210. The method 300 may continue by determining 304 how frequently the activity data describes a first user 125 and a second user 125 that has a second influence score. For example, the determination module 210 determines how frequently the activity data (e.g., search queries, web page views, video and/or audio searches, video and/or audio visits, email correspondences, etc.) describes a first user 125 to determine a first activity score for the first user 125. The determination module 210 also determines how frequently the activity data describes a second user 125 and determines a second activity score for the second user 125. In some implementations, the second user 125 has a second influence score. The method 300 can also include calculating 306 an influence ratio. For example, the determination module 210 calculates an influence ratio based at least in part on the first activity score for the first user 125 and the second activity score for the second user 125. The method 300 can include determining 308 a first influence score for the first user 125 based at least in part on the influence ratio and the second influence score for the second user 125.

Figure 4A:
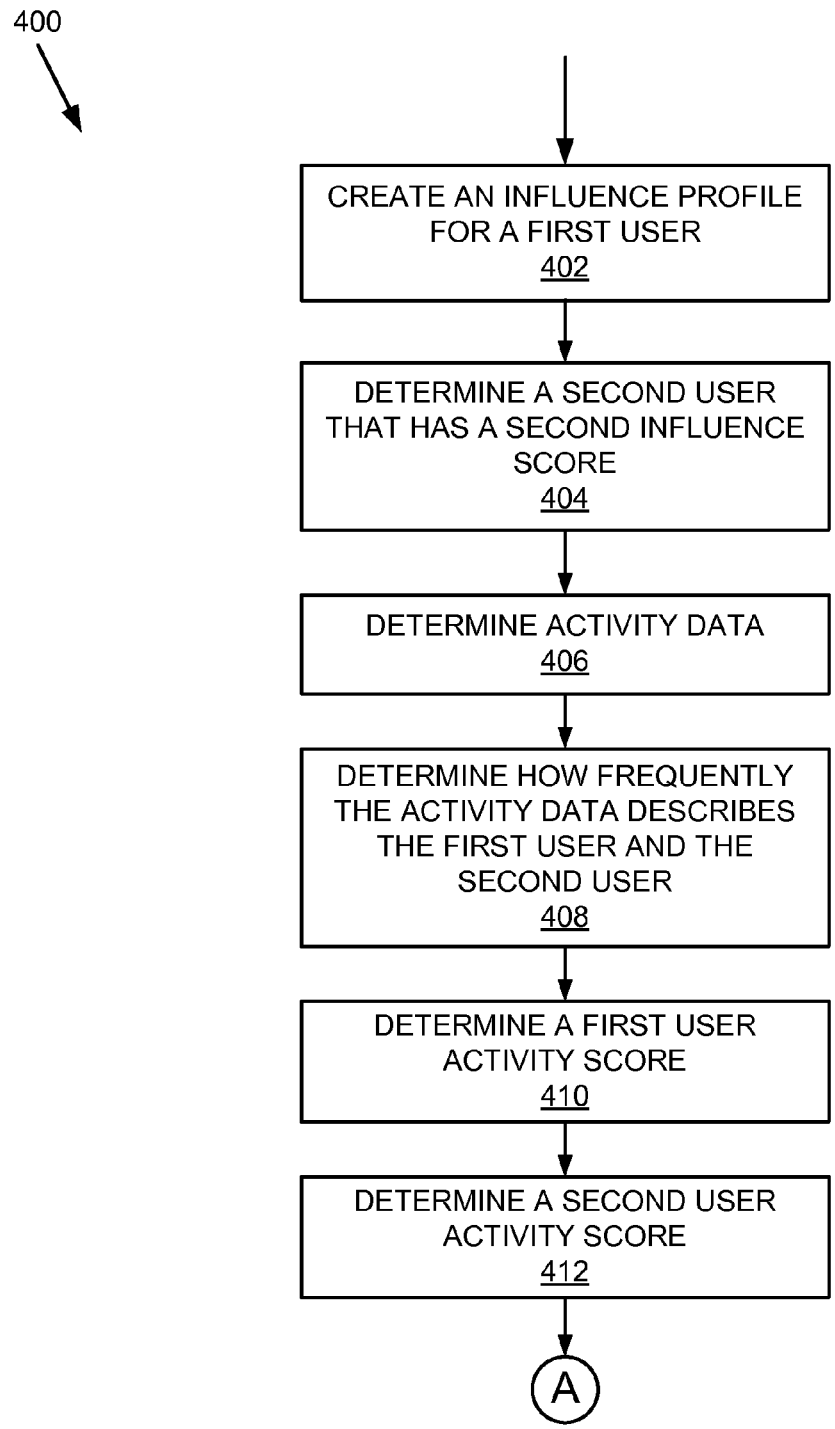
FIGS. 4A-4B are flowcharts of an example method for determining an influence score for a user.
Figure 4B:
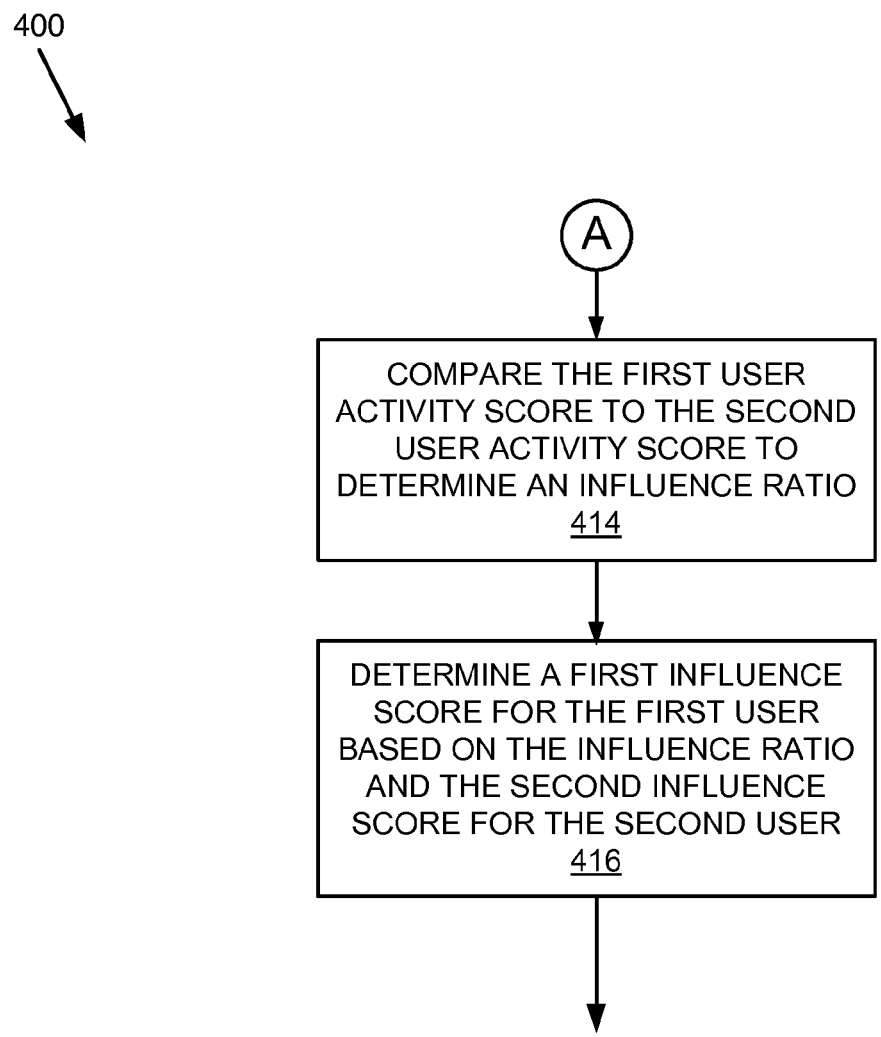

Referring now to FIGS. 4A-4B, an example method 400 for determining an influence score for a user 125 is described. Turning to FIG. 4A, the method 400 can include creating 402 an influence profile for a first user 125. For example, as described above, the classification module 204 creates an influence profile describing information associated with the first user 125. The method 400 may continue by determining 404 a second user 125 that has a second influence score. In some implementations, the association module 208 determines a second user 125 randomly. In some implementations, the association module 208 determines a second user 125 related to the first user 125. For example, the second user 125 belongs to the same category as the first user 125. In some implementations, the second user's 125 second influence score is within a influence score bucket range. One example of a process for determining 404 a second user 125 that has a second influence score is described below in more detail with reference to FIG. 5. The method 400 can include determining 406 activity data that describes the first user 125 and the second user 125. The method 400 may continue by determining 408 how frequently the activity data describes the first user 125 and the second user 125. Two examples of a process for determining 408 whether the activity data describes the first user 125 is described below in more detail with reference to FIGS. 6A-6B. The method 400 can continue by determining 410 a first user activity score for the first user 125 and determining 412 a second user activity score for the second user 125 based at least in part on how frequently the activity data describes the first user 125 and the second user 125.

Turning now to FIG. 4B, the method 400 may continue by comparing the first user activity score to the second user activity score to determine an influence ratio. The method 400 can include determining a first influence score for the first user 125 based at least in part on the influence ratio and the second influence score for the second user 125.

Figure 5:
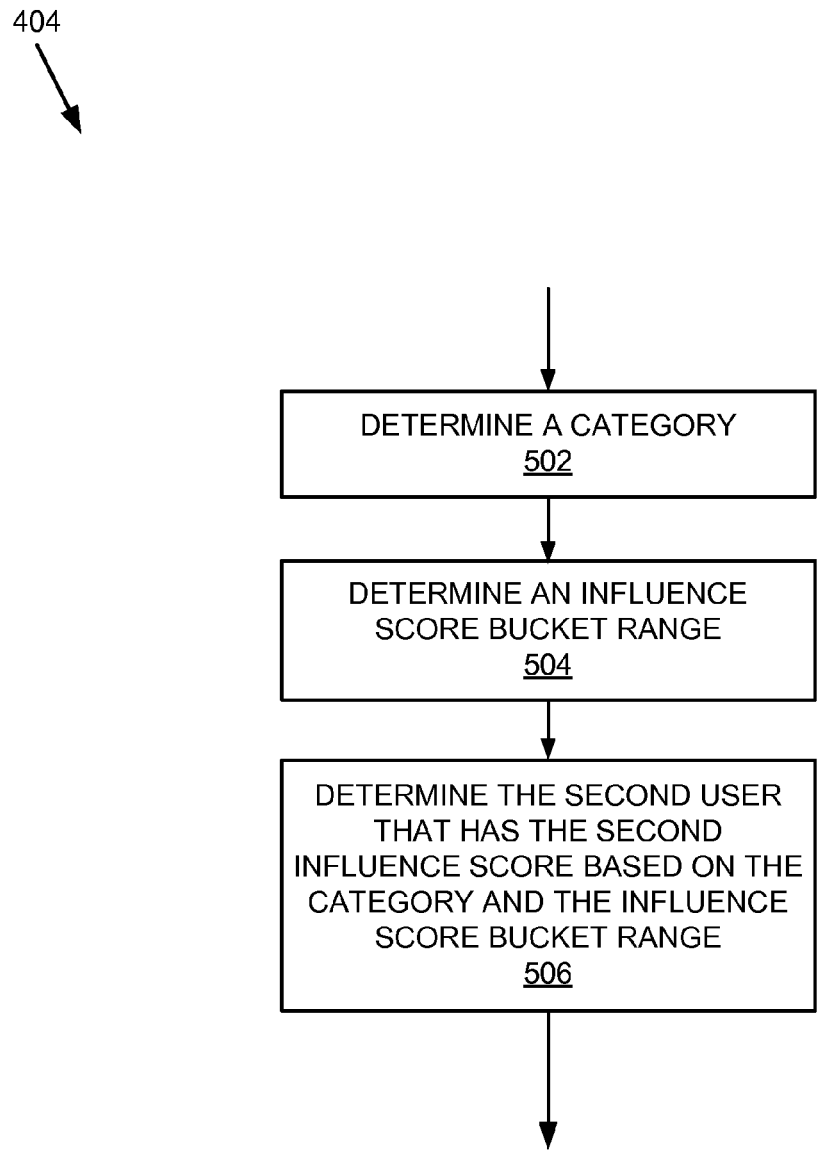
FIG. 5 is a flowchart of an example method for determining a second user associated with a first user.

Referring now to FIG. 5, an example method 404 for determining a second user 125 associated with a first user 125 is described. The method 404 can include determining 502 a category. For example, the association module 208 retrieves, via the controller 202, category data for the first user 125 from the entity database 163 and determines that the first user 125 is classified into a category (e.g., stock trader) based at least in part on the category data. The method 404 can also include determining an influence score bucket range. For example, assume that an influence score scales from 0 to 10. An influence score bucket range can be from 0 to 5 and from 6-10. The association module 208 determines an influence score bucket range as from 6-10. In the illustrated implementations, the method 404 can include determining 506 the second user 125 that has a second influence score based at least in part on the category and the influence score bucket range. For example, assume the first user 125 is a stock trader. Also assume that the influence score bucket range is determined to be from 6-10. Accordingly, the association module 208 determines another stock trader who has an influence score within the range of from 6-10 as the second user 125.

In some implementations, as described above, the association module 208 determines different second users 125 for different influence score bucket ranges. In some implementations, the association module 208 determines different second users 125 for different categories if the first user 125 belongs to more than one categories. The second influence scores for the different second users 125 can be used to calculate different influence ratios for different pairs of category and influence score bucket range. In order to compute an first influence score for the first user 125, the different influence ratios for different pairs can be averaged.

Figure 6A:
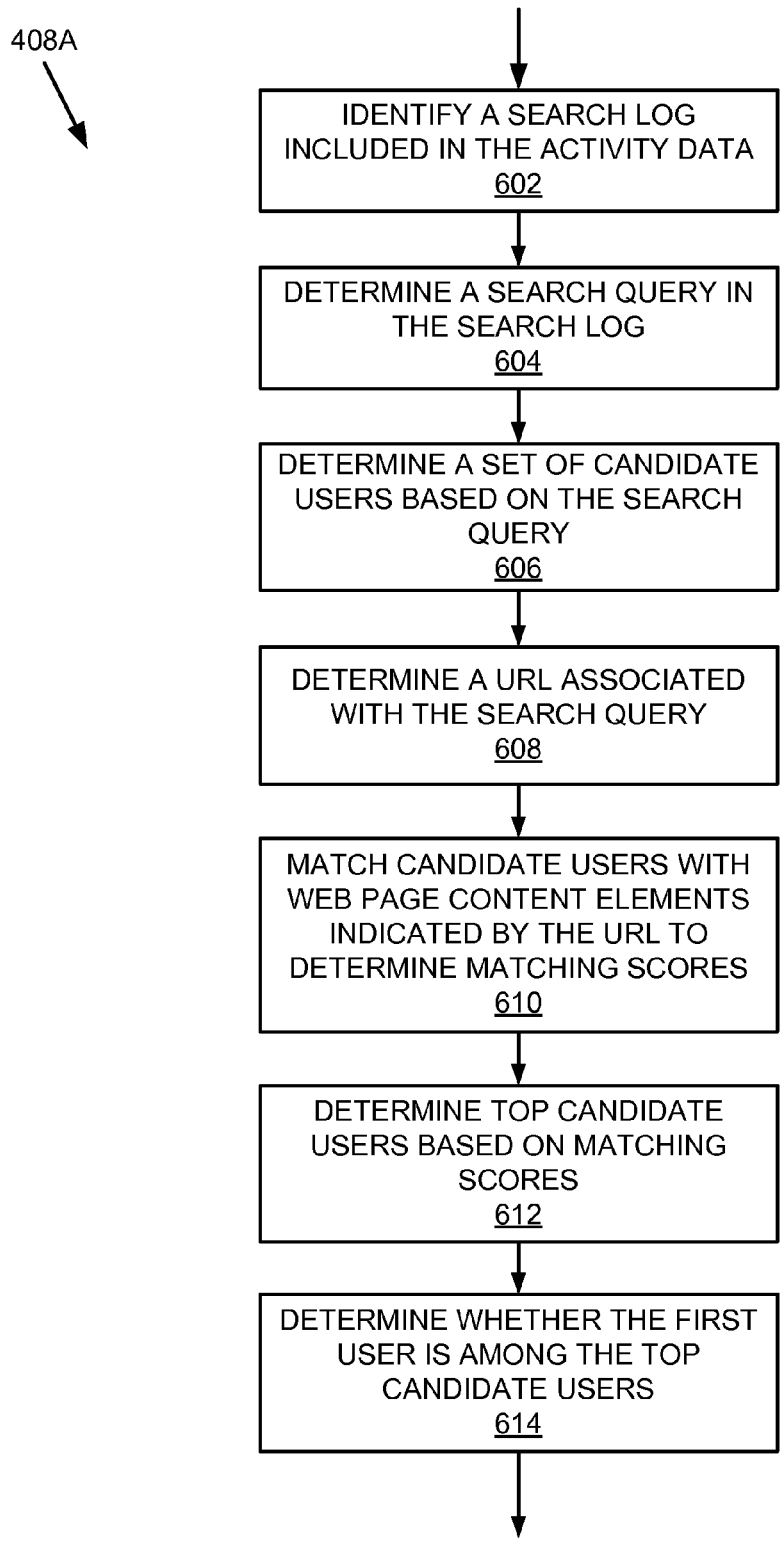
FIG. 6A is a flowchart of an example method for determining how frequently activity data describes a user.
Figure 6B:
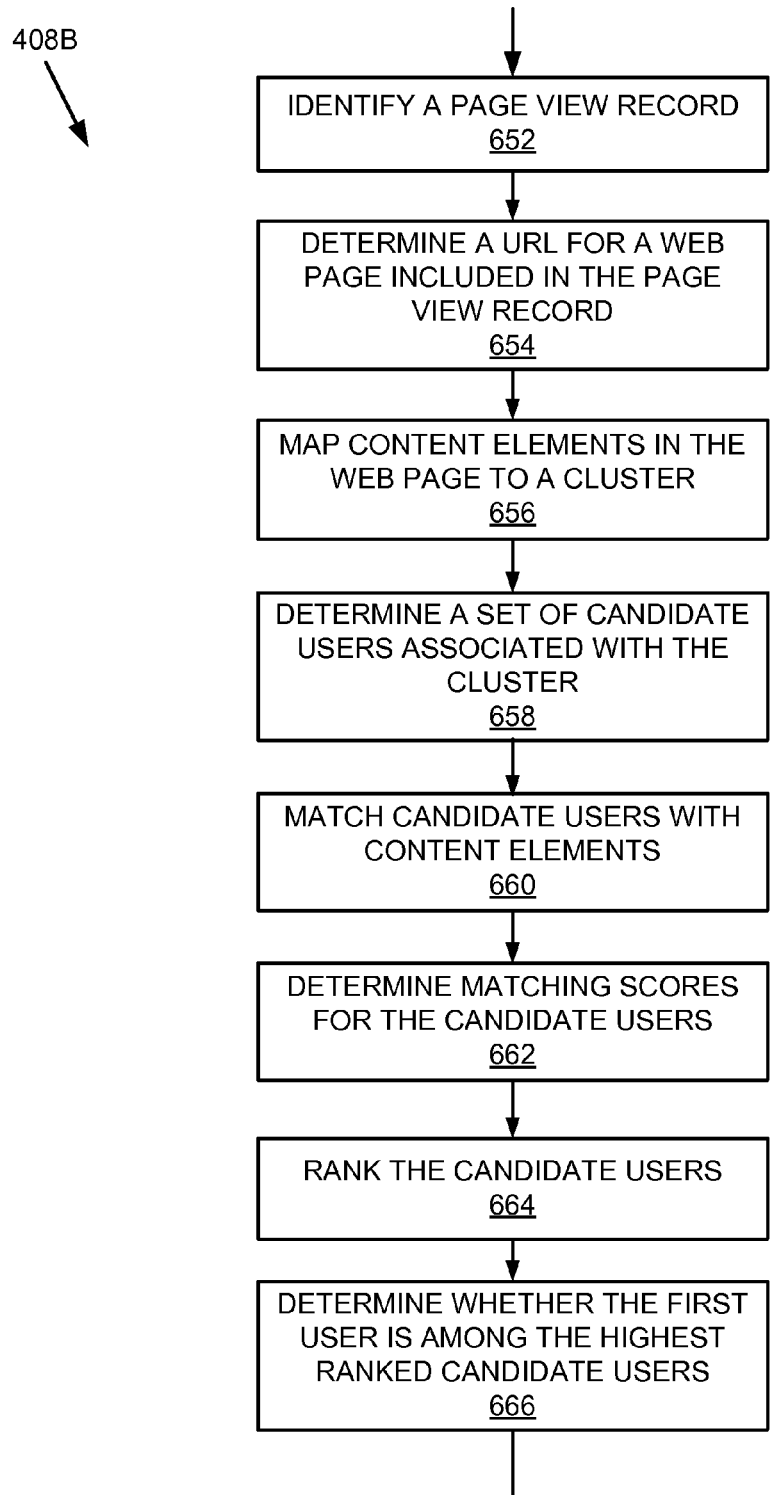
FIG. 6B is a flowchart of an example method for determining how frequently activity data describes a user.

Referring now to FIGS. 6A-6B, two example methods 408 for determining whether the activity data describes the first user 125 are described. Turning to FIG. 6A, an example method 408A for determining whether the activity data describes the first user 125 is described. The method 408A can include identifying 602 a search log included in the activity data and determining 604 a search query in the search log. The method 408A may continue by determining 606 a set of candidate users 125 based at least in part on the search query. For example, the set of candidate users 125 can be indicated by the entity database 163. The method 408A can include determining 608 a URL associated with the search query. For example, the URL links to a web page describing one result for the search query. The method 408A may continue by matching 610 the set of candidate users 125 with the web page content elements indicated by the URL to determine matching scores for the set of candidate users 125. The method 408A can include determining 612 one or more top candidate users 125 based at least in part on the matching scores. For example, the one or more top candidate users 125 have one or more highest matching scores. The method 408A can also include determining 614 whether the first user 125 is among the one or more top candidate users 125.

Turning now to FIG. 6B, an example method 408B for determining whether the activity data describes the first user 125 is described. The method 408B can include identifying 652 a page view record included in the activity data. The method 408B may continue by determining 654 a URL for a web page included in the page view record and mapping 656 content elements in the web page to a cluster. For example, the determination module 210 determines a web page indicated by the URL, parses the content of the web page and maps the content elements included in the web page to a cluster. The method 408B can include determining 658 a set of candidate users 125 associated with the cluster. The method 408B may continue by matching 660 the set of candidate users 125 with the content elements included in the web page and determining 662 matching scores for the set of candidate users 125. The method 408B can also include ranking 664 the set of candidate users 125 based at least in part on the matching scores for the set of candidate users 125 and determining 666 whether the first user 125 is among the highest ranked candidate users 125.

Figure 7:
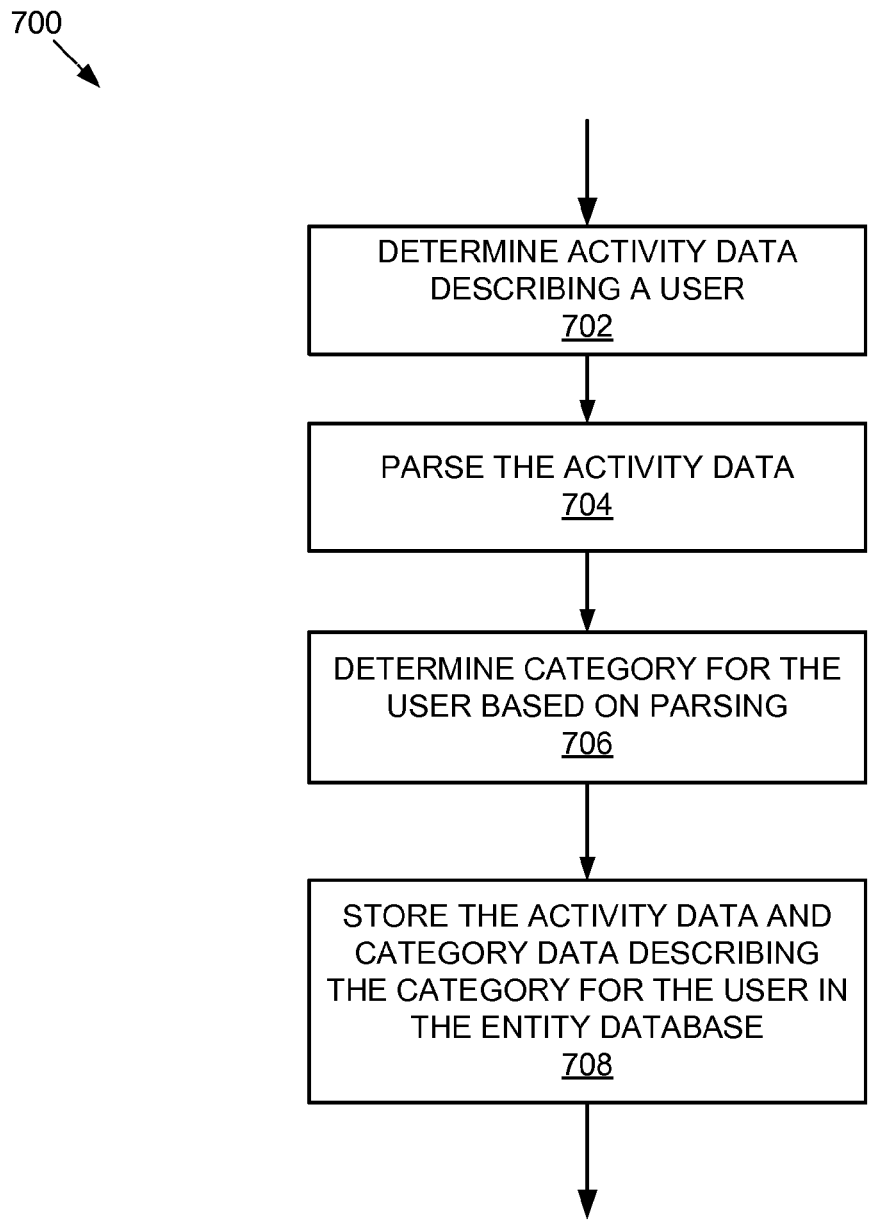
FIG. 7 is a flowchart of an example method for classifying users based at least in part on category.

Referring now to FIG. 7, an example method 700 for classifying a user 125 is described. The method 700 can include determining 702 activity data describing a user 125 and parsing 704 the activity data. The method 700 may continue by determining 706 one or more categories for the user 125 based at least in part on the parsing. The method 700 can also include storing the activity data describing the user 125 and category data describing the one or more categories for the user 125 in the entity database 163.

Systems and methods for changing user profile impression in a social network have been described. In the above description, for purposes of explanation, numerous specific details were set forth. It will be apparent, however, that the disclosed technologies can be practiced without these specific details. In other instances, structures and devices are shown in block diagram form. For example, the disclosed technologies are described in some implementations below with reference to user interfaces and particular hardware. Moreover, the technologies are disclosed above primarily in the context of a social network server; however, the disclosed technologies apply to other data sources and other data types (e.g., collections of other resources, images, audio, web pages, etc.).

Reference in the specification to "some implementations" or "an implementation" means that a particular feature, structure, or characteristic described in connection with the implementation is included in at least some implementations of the disclosed technologies. The appearances of the phrase "in some implementations" in various places in the specification are not necessarily all referring to the same implementation.

Some portions of the detailed descriptions above were presented in terms of processes and symbolic representations of operations on data bits within a computer memory. A process can generally be considered a self consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms, for example, "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be embodied in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present disclosure can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A method comprising:
   determining whether an influence profile for a first user includes a first influence score on a social network;
   responsive to an absence of the first influence score for the first user, determining activity data associated with a set of active users, the activity data including activity of the set of active users from one or more data sources independent of the social network;
   determining a first frequency at which the activity data associated with the set of active users describes the first user and a second frequency at which the activity data associated with the set of active users describes a second user, the second user having an influence profile including a second influence score on the social network;
   determining a first activity score for the first user based at least in part on the first frequency at which the activity data associated with the set of active users describes the first user, the first activity score for the first user indicating a first interest of the set of active users in the first user;
   determining a second activity score for the second user based at least in part on the second frequency at which the activity data associated with the set of active users describes the second user, the second activity score for the second user indicating a second interest of the set of active users in the second user;
   determining an influence ratio using the first activity score for the first user and the second activity score for the second user, the influence ratio corresponding to a ratio of the first influence score for the first user to the second influence score for the second user; and
   determining the first influence score for the first user based at least in part on the influence ratio and the second influence score for the second user.

2. The method of claim 1, wherein determining the first frequency at which the activity data associated with the set of active users describes the first user further comprises:
   determining a search query included in the activity data and a set of candidate users based at least in part on the search query;
   matching the set of candidate users with one or more web page content elements associated with the search query to determine a set of matching scores for the set of candidate users;
   determining a top candidate user from the set of candidate users based at least in part on the set of matching scores, the top candidate user having a highest matching score; and
   determining whether the first user is the top candidate user.

3. The method of claim 1, wherein determining the first frequency at which the activity data associated with the set of active users describes the first user further comprises:
   determining a uniform resource locator for a web page included in the activity data, the web page including one or more content elements;
   mapping the one or more content elements to a cluster;
   determining a set of candidate users associated with the cluster;
   matching the set of candidate users with the one or more content elements to determine a set of matching scores for the set of candidate users;

determining a top candidate user from the set of candidate users based at least in part on the set of matching scores, the top candidate user having a highest matching score; and determining whether the first user is the top candidate user.

4. The method of claim 1 further comprising:

parsing the activity data associated with the set of active users that describes the first user;

determining a category for the first user based at least in part on the parsing of the activity data, the category describing one or more occupations of the first user; and storing the activity data and category data describing the category for the first user in a database.

5. The method of claim 4 further comprising determining the second user based at least in part on the category, the second user having one of the one or more occupations described by the category.

6. The method of claim 1 further comprising:

determining an influence score bucket range; and determining the second user that has the second influence score based at least in part on the influence score bucket range, the second influence score included in the influence score bucket range.

7. The method of claim 1, wherein the activity data includes a search log, a page view history, a video view history, an audio access history and email content record.

8. A computer program product comprising a non-transitory computer usable medium including a computer readable program, wherein the computer readable program when executed on a computer causes the computer to:

determine whether an influence profile for a first user includes a first influence score on a social network;

responsive to an absence of the first influence score for the first user, determine activity data associated with a set of active users, the activity data including activity of the set of active users from one or more data sources independent of the social network;

determine a first frequency at which the activity data associated with the set of active users describes the first user and a second frequency at which the activity data associated with the set of active users describes a second user, the second user having an influence profile including a second influence score on the social network;

determine a first activity score for the first user based at least in part on the first frequency at which the activity data associated with the set of active users describes the first user, the first activity score for the first user indicating a first interest of the set of active users in the first user;

determine a second activity score for the second user based at least in part on the second frequency at which the activity data associated with set of active users describes the second user, the second activity score for the second user indicating a second interest of the set of active users in the second user;

determine an influence ratio using the first activity score for the first user and the second activity score for the second user, the influence ratio corresponding to a ratio of the first influence score for the first user to the second influence score for the second user; and determine the first influence score for the first user based at least in part on the influence ratio and the second influence score for the second user.

9. The computer program product of claim 8, wherein determining the first frequency at which the activity data associated with the set of active users describes the first user further comprises:

determining a search query included in the activity data and a set of candidate users based at least in part on the search query;

matching the set of candidate users with one or more web page content elements associated with the search query to determine a set of matching scores for the set of candidate users;

determining a top candidate user from the set of candidate users based at least in part on the set of matching scores, the top candidate user having a highest matching score; and determining whether the first user is the top candidate user.

10. The computer program product of claim 8, wherein determining the first frequency at which the activity data associated with the set of active users describes the first user further comprises:

determining a uniform resource locator for a web page included in the activity data, the web page including one or more content elements;

mapping the one or more content elements to a cluster;

determining a set of candidate users associated with the cluster;

matching the set of candidate users with the one or more content elements to determine a set of matching scores for the set of candidate users;

determining a top candidate user from the set of candidate users based at least in part on the set of matching scores, the top candidate user having a highest matching score; and determining whether the first user is the top candidate user.

11. The computer program product of claim 8, wherein the computer readable program when executed on the computer causes the computer to also:

parse the activity data associated with the set of active users that describes the first user;

determine a category for the first user based at least in part on the parsing of the activity data, the category describing one or more occupations of the first user; and store the activity data and category data describing the category for the first user in a database.

12. The computer program product of claim 11, wherein the computer readable program when executed on the computer causes the computer to also determine the second user based at least in part on the category, the second user having one of the one or more occupations described by the category.

13. The computer program product of claim 8, wherein the computer readable program when executed on the computer causes the computer to also:

determine an influence score bucket range; and determine the second user that has the second influence score based at least in part on the influence score bucket range, the second influence score included in the influence score bucket range.

14. The computer program product of claim 8, wherein the activity data includes a search log, a page view history, a video view history, an audio access history and email content record.

15. A system comprising:

one or more processors;

an association module stored on a memory and executable by the one or more processors for determining whether an influence profile for a first user includes a first influence score on a social network;

a controller stored on the memory and executable by the one or more processors for determining activity data associated with a set of active users responsive to an absence of the first influence score for the first user, the activity data including activity of the set of active users from one or more data sources independent of the social network;

a determination module stored on the memory and executable by the one or more processors, the determination module communicatively coupled to the controller for determining a first frequency at which the activity data associated with the set of active users describes the first user and a second frequency at which the activity data associated with the set of active users describes a second user, the second user having an influence profile including a second influence score on the social network, the determination module determining a first activity score for the first user based at least in part on the first frequency at which the activity data associated with the set of active users describes the first user, the first activity score for the first user indicating a first interest of the set of active users in the first user and a second activity score for the second user based at least in part on the second frequency at which the activity data associated with the set of active users describes the second user, the second activity score for the second user indicating a second interest of the set of active users in the second user;

a ratio module stored on the memory and executable by the one or more processors, the ratio module communicatively coupled to the determination module for determining an influence ratio using the first activity score for the first user and the second activity score for the second user, the influence ratio corresponding to a ratio of the first influence score for the first user to the second influence score for the second user; and a score module stored on the memory and executable by the one or more processors, the score module communicatively coupled to the ratio module for determining the first influence score for the first user based at least in part on the influence ratio and the second influence score for the second user.

16. The system of claim 15, wherein determining the first frequency at which the activity data associated with the set of active users describes the first user further comprises:

determining a search query included in the activity data and a set of candidate users based at least in part on the search query;

matching the set of candidate users with one or more web page content elements associated with the search query to determine a set of matching scores for the set of candidate users;

determining a top candidate user from the set of candidate users based at least in part on the set of matching scores, the top candidate user having a highest matching score; and determining whether the first user is the top candidate user.

17. The system of claim 15, wherein determining the first frequency at which the activity data associated with the set of active users describes the first user further comprises:

determining a uniform resource locator for a web page included in the activity data, the web page including one or more content elements;

mapping the one or more content elements to a cluster;

determining a set of candidate users associated with the cluster;

matching the set of candidate users with the one or more content elements to determine a set of matching scores for the set of candidate users;

determining a top candidate user from the set of candidate users based at least in part on the set of matching scores, the top candidate user having a highest matching score; and determining whether the first user is the top candidate user.

18. The system of claim 15, further comprising a classification module for parsing the activity data associated with the set of active users that describes the first user, determining a category for the first user based at least in part on the parsing of the activity data, the category describing one or more occupations of the first user and storing the activity data and category data describing the category for the first user in a database.

19. The system of claim 18, wherein the association module further determines the second user based at least in part on the category, the second user having one of the one or more occupations described by the category.

20. The system of claim 15, wherein the association module further determines an influence score bucket range and determines the second user that has the second influence score based at least in part on the influence score bucket range, the second influence score included in the influence score bucket range.

* * * * *